United States Patent
Gunasekara et al.

(10) Patent No.: US 8,224,241 B1
(45) Date of Patent: Jul. 17, 2012

(54) SYSTEM AND METHOD FOR ANTENNA ORIENTATION FOR MOBILE APPLICATIONS

(75) Inventors: Don Gunasekara, Reston, VA (US); Tom Wilson, Overland Park, KS (US)

(73) Assignee: Nextel Communications Inc., Reston, VA (US)

( * ) Notice: Subject to any disclaimer, the term of this patent is extended or adjusted under 35 U.S.C. 154(b) by 844 days.

(21) Appl. No.: 11/773,847

(22) Filed: Jul. 5, 2007

(51) Int. Cl.
| | |
|---|---|
| H04B 7/14 | (2006.01) |
| H04B 7/185 | (2006.01) |
| H04B 1/00 | (2006.01) |
| H04B 15/00 | (2006.01) |
| H03C 7/02 | (2006.01) |
| H04W 24/00 | (2009.01) |
| H04W 4/00 | (2009.01) |
| G01S 19/00 | (2010.01) |
| G01S 19/42 | (2010.01) |
| G01S 19/51 | (2010.01) |

(52) U.S. Cl. .......... 455/25; 455/13.3; 455/19; 455/63.4; 455/101; 455/69; 455/456.1; 455/436; 342/357.2; 342/375.25; 342/374.34

(58) Field of Classification Search .................. 455/25, 455/13.3, 19, 63.4, 101, 69, 456.1, 436; 342/357.2, 342/357.25, 357.34
See application file for complete search history.

(56) References Cited

U.S. PATENT DOCUMENTS

| | | | |
|---|---|---|---|
| 3,490,022 A | 1/1970 | Eisenberg et al. | |
| 5,668,562 A | 9/1997 | Cutrer et al. | |
| 5,946,603 A * | 8/1999 | Ibanez-Meier et al. | 455/13.1 |
| 5,982,333 A | 11/1999 | Stillinger et al. | |
| 6,169,881 B1 * | 1/2001 | Astrom et al. | 455/12.1 |
| 6,243,046 B1 * | 6/2001 | Aoki | 343/765 |
| 6,741,933 B1 * | 5/2004 | Glass | 701/454 |
| 6,885,674 B2 | 4/2005 | Hunt et al. | |
| 6,980,772 B1 * | 12/2005 | Underbrink et al. | 455/63.4 |
| 7,072,698 B2 * | 7/2006 | Underbrink et al. | 455/575.5 |
| 7,515,874 B2 * | 4/2009 | Nikolajevic et al. | 455/41.2 |
| 2003/0109231 A1 | 6/2003 | Marcus et al. | |
| 2003/0181163 A1 * | 9/2003 | Ofuji et al. | 455/25 |
| 2003/0224784 A1 | 12/2003 | Hunt et al. | |
| 2004/0155830 A1 * | 8/2004 | Petersson | 343/775 |
| 2005/0075070 A1 * | 4/2005 | Crilly, Jr. | 455/13.3 |
| 2006/0052059 A1 | 3/2006 | Hyslop | |
| 2006/0119509 A1 * | 6/2006 | Wang et al. | 342/359 |
| 2006/0232468 A1 | 10/2006 | Parker et al. | |
| 2006/0284765 A1 * | 12/2006 | Bernhardt et al. | 342/357.09 |
| 2007/0115173 A1 * | 5/2007 | Nelson | 342/359 |
| 2007/0135042 A1 * | 6/2007 | Shiff et al. | 455/13.3 |
| 2008/0070575 A1 * | 3/2008 | Claussen et al. | 455/436 |
| 2009/0054064 A1 * | 2/2009 | Chuang | 455/436 |
| 2009/0156118 A1 * | 6/2009 | Schadler | 455/25 |
| 2009/0233602 A1 * | 9/2009 | Hughes | 455/436 |

* cited by examiner

*Primary Examiner* — Bobbak Safaipour

(57) ABSTRACT

Wireless communication is provided using very low frequency signals to environments that are otherwise difficult to reach. In one embodiment, a mobile wireless system is configured to automatically orient its antenna. A monitoring module is used to detect a current signal strength of a received radio frequency signal, as well as a current position for the mobile system. This information is compared to an expected signal strength for the current position in order to determine if the antenna should be adjusted or otherwise realigned.

26 Claims, 5 Drawing Sheets

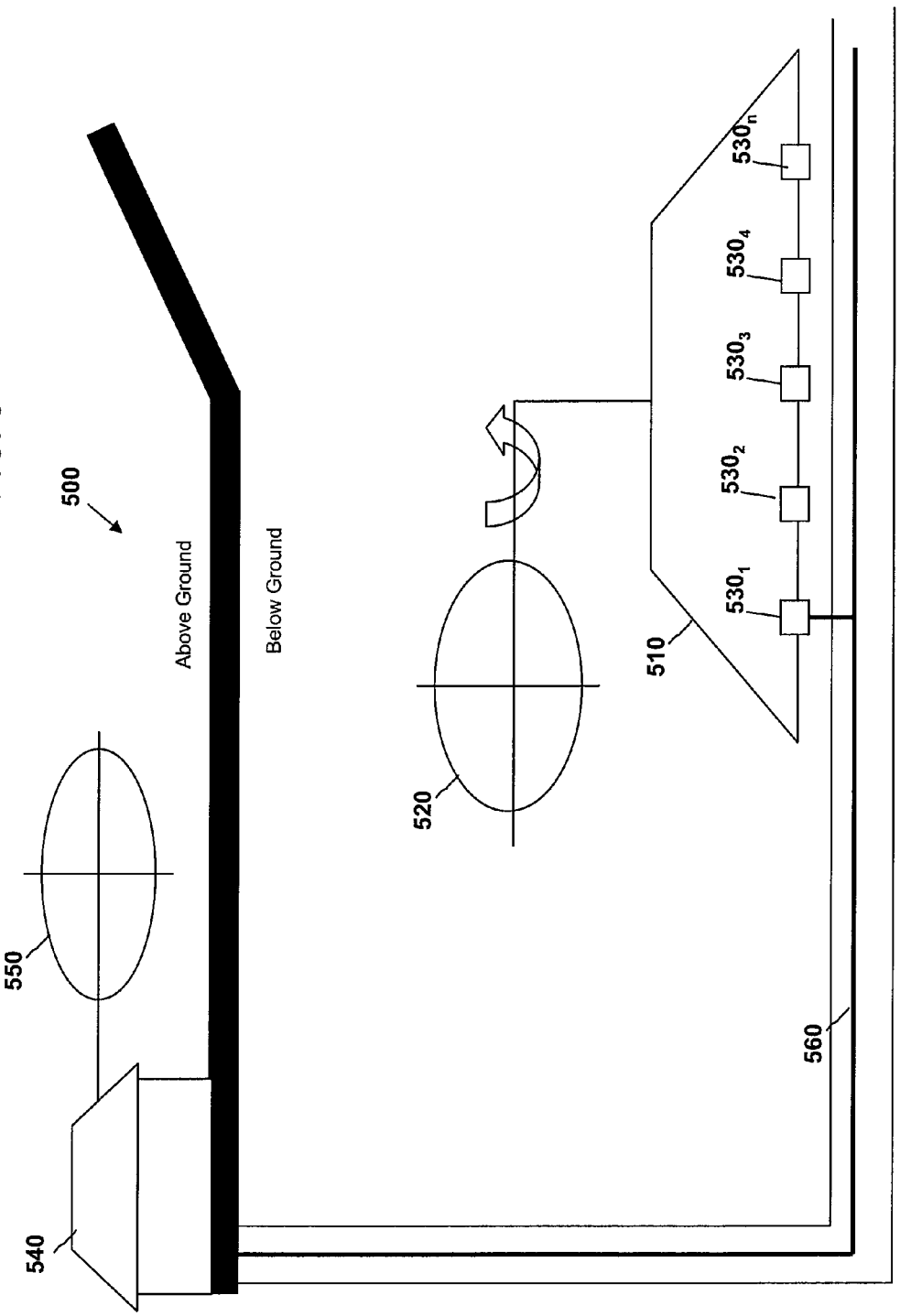

SYSTEM AND METHOD FOR ANTENNA ORIENTATION FOR MOBILE APPLICATIONS

FIELD OF THE INVENTION

The present invention relates generally to communication systems, and more particularly to providing antenna orientation for wireless mobile communications.

BACKGROUND OF THE INVENTION

Underground mines have proven to be resistant to wireless communication due to environmental conditions that limit the transmission of radio waves. Typical radio waves used in wireless communications can only propagate a few feet before they are absorbed, diffracted, or reflected from rocks, walls, and other objects in the mine. Thus, most mines have hardwired communication systems, referred to as leaky coax cable systems.

However, hardwired communication systems are vulnerable to explosions, fire or cave-ins—all of which will tend to cut off communications with both the rest of the mine, as well as with aboveground parties. In addition, such hardwired systems are particularly susceptible to being run over by the heavy equipment moving in and out of the mine. Underground communications also tend to require the frequent relocation of communication access points. That, coupled with the already harsh conditions, leads to high system maintenance costs as well as unacceptable risks associated with loss of communications.

As such, there has been an increased interest in providing wireless communication solutions for underground communication applications, as well as other applications in which hardwired systems are susceptible. However, providing a mobile wireless solution capable of delivering continuous communication to such an environment has proved elusive.

SUMMARY OF THE INVENTION

Disclosed and claimed herein are systems and methods for automatically tuning an antenna of a mobile system. In one embodiment, a method includes detecting a current signal characteristic of a received radio frequency signal, determining a current position for a mobile system, accessing an expected signal characteristic for the radio frequency signal at the current position. The method further includes determining a difference between the current signal characteristic and the expected signal characteristic, and then adjusting a current orientation of the antenna when this difference exceeds a predetermined threshold.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 5 depicts another embodiment of a network-assisted embodiment of a mobile system configured in accordance with the principles of the invention.

DETAILED DESCRIPTION OF THE EXEMPLARY EMBODIMENTS

Figure 1:
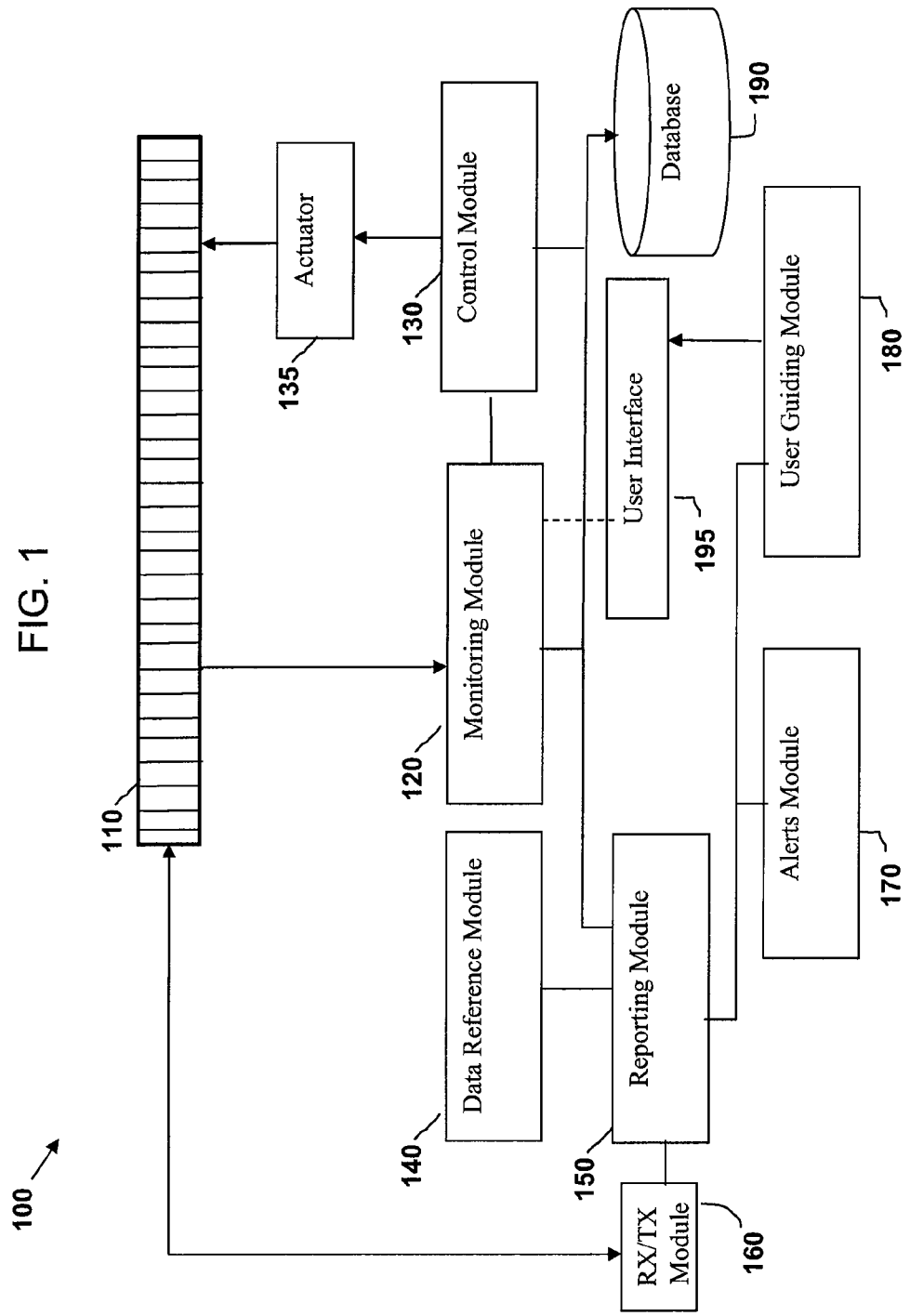
FIG. 1 is a block diagram illustrating one embodiment of a mobile system configured in accordance with the principles of the invention.

One aspect of the invention relates to providing an uninterrupted communication channel in an underground environment using a mobile wireless system. In one embodiment, the mobile wireless system utilizes low frequency, or very low frequency electromagnetic waves that can penetrate several hundred meters of solid rock, such as may be the case in an underground mine.

Another aspect of the invention is to provide a mobile wireless system configured with an automatic self-adjusting antenna system. In certain embodiments the mobile wireless system may be a standalone system. In other embodiments it may also be a network-assisted system in which certain functions or operations are carried out remotely and communicated to the mobile wireless system. As will be described in more detail below, a mobile system configured in accordance with one embodiment of the invention includes a monitoring module for detecting a current signal characteristic (e.g., signal strength) of a received RF signal, as well as for monitoring a current position for the mobile system itself. A data reference module may then access an expected signal characteristic (e.g., signal strength) for the RF signal at the current position. In one embodiment, a reporting module may then determine if there is any significant difference between the current signal characteristic and the expected signal characteristic for the current position. If so, a control module may then be used to adjust the current orientation of the antenna so as to improve the signal characteristics.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are some-times referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc. References to "modules" refers to software, hardware or any combination thereof.

FIG. 1 illustrates a system 100 configured to implement one or more embodiments of the invention. System 100 may be a mobile or portable system carried in a backpack-type assembly. System 100 may also be configured as a handheld device. In any case, system 100 may be designed to be physically carried by a user into an underground environment (e.g., mine), or any other environment in which wireless communications may be useful or otherwise desired.

System 100 includes antenna 110, which in one embodiment may be a ferrite-loaded loop antenna configured to rotate about an axis through some predetermined range (e.g., under the control of a servo motor). In other embodiments, the antenna may be configured as a conventional whip antenna, an active whip antennas, a conventional loop antenna, multi-turn loop antenna, or any other antenna consistent with the principles of the invention. Regardless of configuration, the antenna 110 may be designed to send and receive very low frequency (VLF) radio frequency (RF) signals in the range of 3 to 30 kHz. However, the antenna 110 may be similarly designed to operate at lower frequencies (e.g., extremely low, super low and ultra-low frequencies), as well as at higher frequencies (e.g., low, medium, high, very high frequencies, etc.). In certain embodiments, such RF signals, such as VLF RF signals, are able to penetrate through hundreds of meters of sold rock, such as may be the case with a cave-in in a mining context. In this fashion, an uninterrupted communication channel is maintained, even under conditions which would render traditional hardwired systems highly susceptible to being compromised.

As shown, the antenna 110 includes a first interface for connecting to a monitoring module 120 and a second interface for connecting to a control module 130 via actuator 135 (e.g., servo motor). However, in another embodiment the monitoring module 120 and control module 130 may be electrically connected to the actuator 135 of the antenna 110. Regardless of configuration, the monitoring module 120 may be configured to monitor the signal strength and/or noise level of an RF signal being received by the antenna 110, while the control module 130 may be configured to provide a control signal to the actuator 135, which in one embodiment may be a servo motor configured to rotate or otherwise orient the antenna 110 to a new position, either horizontally or vertically. The monitoring module 120 may be further configured to monitor the user's position, such as when grid-based positioning is available. It should be appreciated that the current position or orientation of the antenna 110 (and hence the user of the system 100) may also be monitored by the monitoring module 120.

The data reference module 140 may include predefined information relating to RF signal strength and noise at a particular location and/or orientation. Such information may include, for example, signal strength and noise as a function of the coordinate location of the system 100. In the context of a mining application, for example, the data reference module 140 may have signal information for a particular tunnel which includes signal information at various coordinates (e.g., X and Y coordinates) along the length of the tunnel. As ambient conditions (e.g., humidity, temperature, etc.) within the tunnel may also affect signal strength, such information may also be included in the data reference module 140. In this fashion, the information contained in the data reference module 140 is representative of the RF signal characteristics that should be experienced at a given location, and for given ambient conditions, with a properly aligned antenna.

System 100 also includes reporting module 150, which includes interfaces to virtually all of the components of the system 100, including to the data reference module 140, the RX/TX module 160, the alerts module 170, the user guiding module 180 and so on. In certain embodiments, the reporting module 150 may function to receive information from certain components (e.g., data reference module 140, monitoring module 120, control module 130) and report or output selected information through one or more of the RX/TX module 160, the alerts module 170 and user guiding module 180. For example, in order to save battery power the servo of the antenna 110 may be configured to rotate only through a predetermined range (e.g., 180 degrees). If the limits of this range are reached, this information may be provided by the monitoring module 120 to the reporting module 150, which may in turn provide it to the alerts module 170. The alerts module may be configured to output some indication to the user that the limits of the antenna rotation have been reached. Alternatively, this information may be provided to the user guiding module 180 so as to enable the user to manually tune or adjust the position of the antenna 110.

Continuing to refer to FIG. 1, system 100 also includes database 190 which may be used to provide a recording function for the system 100. For example, database 190 may be used to store position information which may be useful in cases where an accident has occurred and it is necessary to determine the user's last known position. In another embodiment, the database 190 may also collect signal information as a function of position so as to update or supplement the signal information stored in the data reference module 140. In many cases, grid-based positioning information is available in underground applications, and the database 190 may be used to accumulate data such as signal strength, position, time, etc. Finally, system 100 includes a user interface 195 for receiving user inputs, as well as for displaying information or providing user alerts.

With respect to positioning the antenna 110, it should be appreciated that the antenna's position and/or orientation may be tuned in a variety of ways. Thus, references herein to positioning, tuning or aligning an antenna include modifying the orientation of an antenna about a vertical axis, the angular orientation of a loop antenna about a vertical axis, the angular orientation of a loop antenna about a horizontal axis, the diameter of the loop antenna, length of the whip antenna and other attributes such as antenna amplifier gain, resonant frequency, etc.

Figure 2:
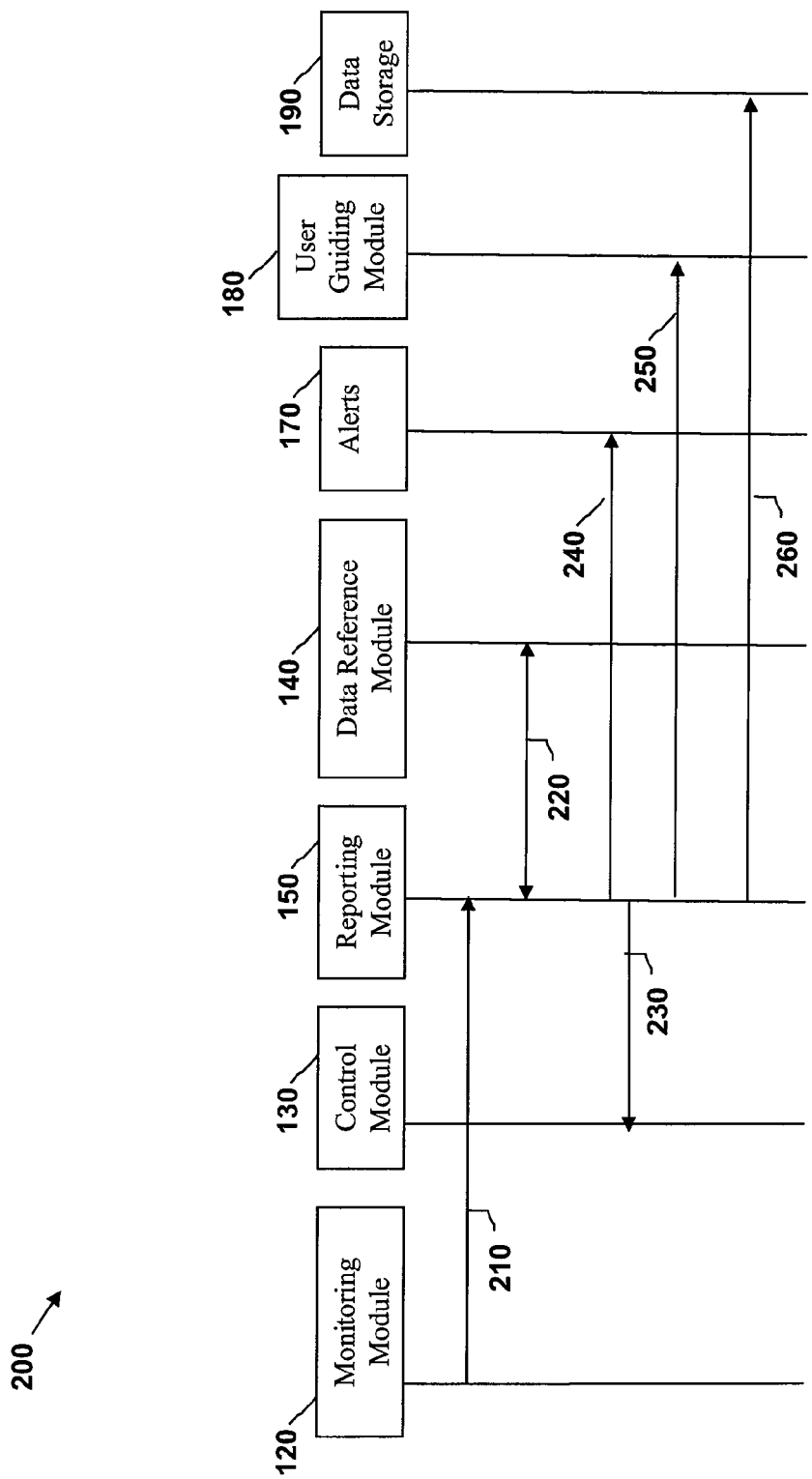
FIG. 2 is a signal flow diagram for carrying one or more aspects of the invention using the mobile system of FIG. 1.

Referring now to FIG. 2, a signal flow diagram 200 for various components of system 110 of FIG. 1 is depicted in accordance with one embodiment. In particular, diagram 200 corresponds to an embodiment of system 100 which is configured to automatically tune or orient the antenna 110 so as to maintain an optimal continuous RF connection given the user's current position.

The monitoring module 120 may continuously track the signal strength and/or noise of received signal(s) of the antenna 110. This signal strength/noise information may then be provided to the reporting module 150 as signal 210. Additionally, the monitoring module 120 may be further monitoring the position of the user so as to be able to provide position information (e.g., user coordinates) to the reporting module 150 in signal 210 as well.

Reporting module 150 may then verify the status of the system by consulting the data reference module 140. In particular, the data supplied by the monitoring module 120 (in signal 210, for example) may be compared with the preprogrammed values stored in the data reference module 150 corresponding to the current position and conditions. This signal exchange, illustrated as signals 220, may correspond to a series of back-and-forth command and data exchanges between the reporting module 150 and the data reference module 140.

In certain embodiments, the result of the exchange of signals 220 may be to identify any deviation between the actual signal strength/noise (as reported by the monitoring module 120) and the expected signal strength/noise (based on data from the data reference module 140) for the user's current position. If this difference exceeds a predefined threshold, the reporting module 150 may issue a command 230 to the control module 130 to tune or orient the antenna 110 using the actuator 135 (e.g., a servo motor) coupled to the antenna 110 to the system 100, as described above with reference to FIG. 1.

In certain embodiments, signals 210, 220 and 230 may continue to be exchanged as a function of the user's movement in an iterative fashion. Hence, if the user continues to move, signal 210 will be sent to the reporting module 150, signals 220 will then be exchanged, and then command 230 will be issued if necessary. If the user stops moving, however, signal 210 may not be sent since there is presumably no need to adjust the antenna 110 and it may be desirable to conserve energy by not making unnecessary adjustments. In another embodiment, the tuning function of signals 210, 220 and 230 may be performed a predetermined number of times (e.g., 3 times) for a given position. This is due to the fact that the system may not be able to tune the antenna properly to receive the expected signal strength/noise for the given position on the first tuning attempt. In that case, the tuning function of signals 210, 220 and 230 may be repeated the predetermined number of times. If the system is still unable to reduce the detected signal deviation below the threshold amount, signal 250 may be provided so that the user can manually adjust the antenna so as to conserve the available power. In this fashion, the system is able to maintain an optimal antenna orientation and position regardless of the user's movement, while also conserving power.

Continuing to refer to the signal flow diagram 200 of FIG. 2, the reporting module 150 may further be configured to provide a user alert in the event that the user is about to be, or already is, outside of the system's communication range. To that end, alert signal 240 may be provided to the alert module 170 when the reporting module 150 detects that the communication range has been, or is about to be exceeded by the user. Thus, the user will be alerted to possible communication breakdowns before (or as) they occur. The alert provided by alert module 170 in response to alert signal 260 may be any form, including any audible sound or visual light or effect, and may be provided using the system's user interface (i.e., user interface 195).

In some cases, the automatic tuning functionality of the system may be supplemented or fine-tuned by the user guiding module 180. To that end, the reporting module 150 may provide tuning signal 250 to the user guiding module 180 to instruct the user on how to manipulate the orientation of the antenna 100 so as to receive the optimal signal for the current position. This information may be displayed using the system's user interface, such user interface 195. Alternatively, the information may be provided to the user as a speech-based instruction. Additionally, tuning signal 250 may also be provided when a successive number of automatic tuning attempts have failed, as described above.

In another embodiment, reporting module is further configured to provide data (e.g., user position, signal strength, time, etc.) as data signal 260 to database 190 for use in rescue and accident reconstruction in the event of a disaster.

Figure 3:
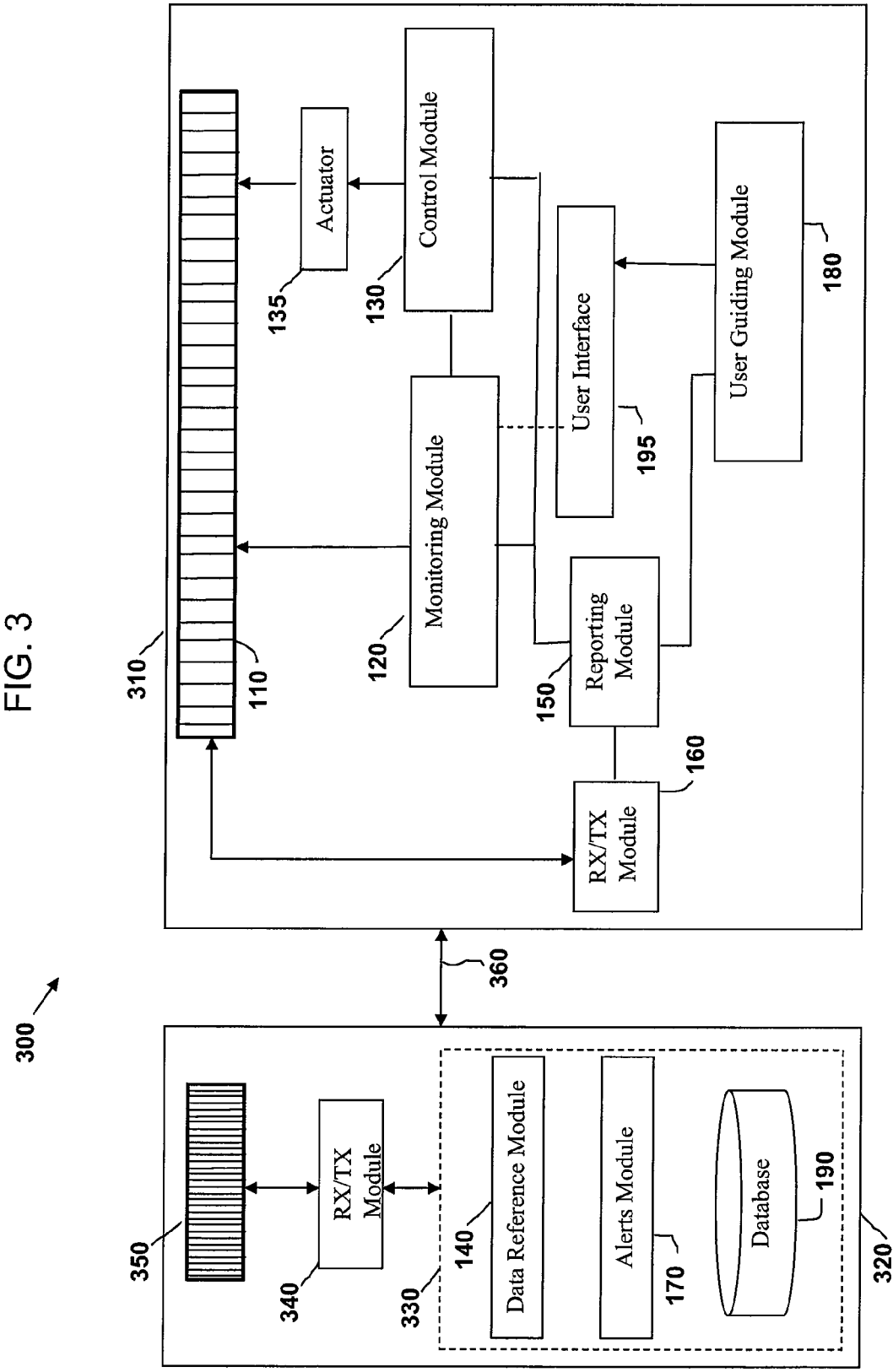
FIG. 3 is a block diagram illustrating a network-assisted embodiment of a mobile system configured in accordance with the principles of the invention.

Referring now to FIG. 3, another embodiment of a system 300 for carrying out one embodiment of the invention in a network-assisted environment is depicted. In particular, system 300 includes a mobile system 310, which in one embodiment may be a backpack-type assembly or handheld system. System 300 further comprises a control station 320, which is a fixed station located remotely from the mobile system 310. In underground applications such as mining, the mobile system 310 may be physically carried by a user into an underground environment, while the control station 320 may be remotely located at an aboveground location, for example.

System 300 is depicted as including essentially the same components as system 100 of FIG. 1, except that certain of the components have been incorporated into the control station 320 rather than into the mobile system 310. For example, the data reference module 140, alerts module 170 and database 190 have all been offloaded to the control station 320 and depicted as control station modules 330. In certain embodiments, this may have the desired effect of conserving power in the mobile system 310. It should be of course be appreciated that not all of these components need be incorporated into the control station 320, and that FIG. 3 is but one example of a network-assisted embodiment of the invention.

In order to effectuate the invention, wireless communication is enabled between the mobile system 310 and the control station 320. While in one embodiment this communication is carried on a VLF RF signal, it should equally be appreciated that other frequencies may similarly be used in accordance with the principles of the invention. To that end, control station 320 includes a corresponding RX/TX module 340 and antenna 350 for exchanging RF signals 360 with the mobile system 310. As will be described in more detail below with reference to FIG. 4, RF signals 360 may include the various data and command signals exchanged between the components of the mobile system 310 and the control station 320. To that end, signals 360 may be sent using a light-weight command and control protocol whereby short and long codes are mapped to specific signals such that the received codes may be transformed to the corresponding message/signal.

Additionally, the RX/TX module 340 may be configured to accommodate a leaky feeder/coax cable connection, as is known in the art. In this fashion, communication may be enabled between the mobile system 310 and the control station 320 using either a wireline connection (e.g., leaky feeder/coax cable) and/or a wireless connection.

Figure 4:
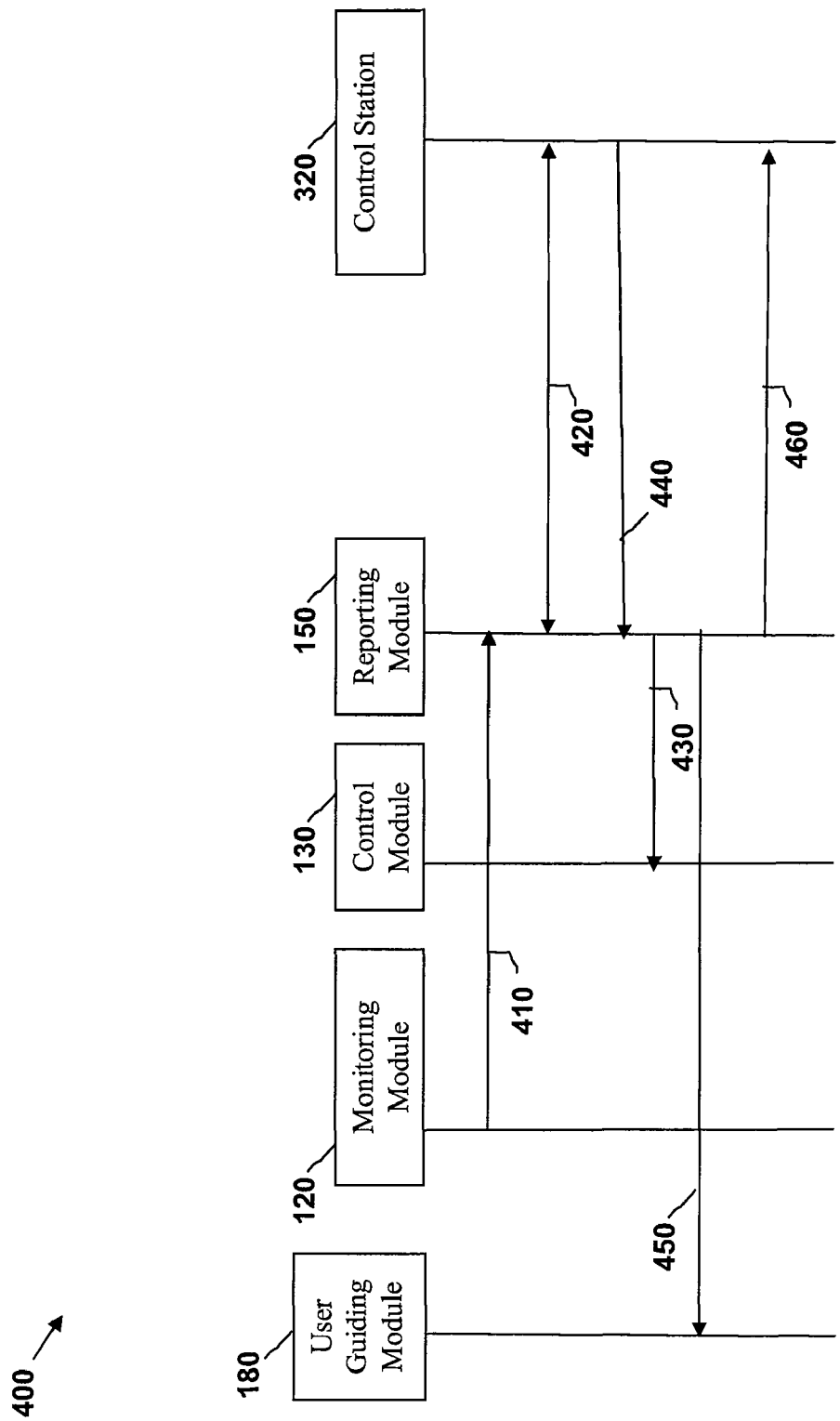
FIG. 4 is a signal flow diagram for carrying one or more aspects of the invention using the network-assisted mobile system of FIG. 3.

FIG. 4 is one embodiment of a signal flow diagram 400 for the system 300 of FIG. 3. In particular, the embodiment of FIG. 4 corresponds to the system 300 which is configured to tune or orient the antenna 110, as described above, with the assistance of a connected network, depicted as control station 320. In this fashion, some of the components of system 100 may be omitted, and their functions carried out by the network's control station 320. This may desirable in order to conserve system power, for example.

Signal flow diagram 400 includes a signal 410 generated by the monitoring module 120, which may continuously tracks the signal strength and/or noise of received signal(s) of the antenna 110. This signal strength/noise information is provided to the reporting module 150 as signal 410, as was the case above with signal 210 of FIG. 2. Additionally, the monitoring module 120 may be further monitoring the position of the user so as to be able to provide position information (e.g., user coordinates) to the reporting module 150 in signal 410 as well.

Reporting module 150 may then report this position and signal information to the control station 320 as signal 420. At the control station, the data supplied by the monitoring module 120 (in signal 410, for example) may be compared with the preprogrammed values stored at a data reference module, which is at the control station 320 in the embodiment of FIGS. 3-4. This signal exchange, illustrated as signal 420, may correspond to a series of back-and-forth command and data exchanges between the reporting module 150 and the data reference module of the control station 320.

In certain embodiments, the result of the exchange of signals 420 may be to identify any deviation between the actual signal strength/noise (as reported by the monitoring module 120) and the expected signal strength/noise (based on data from the data reference module of the control station 320) for the user's current position. If this difference exceeds a predefined threshold, the reporting module 150 may issue a command 430 to the control module 130 to tune or orient the antenna 110 using the actuator 135 (e.g., a servo motor) coupled to the antenna 110 to the system 100, as described above with reference to FIG. 1.

Signals 410, 420 and 430 may continue to be exchanged as a function of the user's movement in an iterative fashion. It should be appreciated that signal 450 may be provided by the reporting module 150 to the user guiding module 180 so as to enable the user to manually adjust the antenna in order to conserve power. Additionally, the reporting module 150 may further be configured to provide a user alert in the event that the user is about to be, or already is, outside of the system's communication range. To that end, control station 320 may provide an alert signal 440 to the reporting module 150 when it detects that the communication range has been, or is about to be exceeded by the user. Again, the user's position information is available to the control station 320 by virtue of the information provided by the monitoring module 120.

In another embodiment, the reporting module 150 may be further configured to provide data (e.g., user position, signal strength, time, etc.) as data signal 460 to control station 320 for use in rescue and accident reconstruction in the event of a disaster.

In this fashion, the signal flows of FIG. 4, as implemented by the network-assisted system 300 of FIG. 3, may be used to further conserve power of the mobile system by offloading or otherwise transferring certain operations to a remote station, such as control station 320.

The signals comprising signal flow diagram 400 may be sent using a TCI/IP-based protocol with specific port bind applications to generate or present the commands and/or data (e.g., command 430). Additionally, the invention may utilize a light-weight command and control protocol whereby short and long codes are mapped to the various signals of FIG. 4, such that received codes may be transformed to the corresponding message/signal.

Referring now to FIG. 5, depicted is another embodiment of a network-assisted system 500 in which a mobile system 510 (e.g., backpack-type assembly or handheld system) may be located in an underground environment, but communicate wirelessly with an aboveground control station 540. As with the embodiment of FIG. 3 described above, the mobile system 510 includes an antenna 520, which is depicted in FIG. 5 as being a horizontal loop antenna which may be tuned by rotation about a central axis using the signal flows described above with reference to FIG. 4 for tuning the antenna 520. As such, it should be appreciated that, although not individually depicted in FIG. 5, mobile system 510 may be configured with the same components as the previously-described mobile system 310 of FIG. 3.

The mobile system 510 further includes a plurality of communication interfaces $530_1$-$530_n$. In certain embodiments, such communication interfaces may include an Ethernet interface, a VLF interface, a Wi-Fi interface, a Wi-Max interface, a UHF interface, etc.

Network-assisted system 500 further includes an aboveground control station 540, depicted with attached antenna 550. While the antenna 550 is depicted as having a horizontal loop antenna configuration, it should equally be appreciated that it may have numerous other configurations and be consistent with the principles of the invention. As with the control station 320 of FIG. 3, control station 540 may include one or more operation modules, such as a data reference module, alerts module and database, etc. In certain embodiments, this configuration may have the desired effect of conserving power in the mobile system 510.

Still another aspect of the system 500 is to provide multiple (or alternative) means of communication between the mobile system 510 and the remotely-located control station 540. To that end, interface $530_1$ (e.g., Ethernet) may be used to couple the mobile system 500 to a leaky feeder/coax cable 560. As shown, the leaky feeder/coax cable 560 may be used to provide wireline communication between the mobile station 510 and the control station 540. In certain embodiments, leaky feeder/coax cable 560 may be used for standard voice and data communications between the mobile system 510 and the control station 560, thereby functioning as an alternative to the wireless communications described above. In this fashion, the wireless RF communications enabled by antenna 520 may serve a backup function in the event there is an interruption to the wireline communications provided by the leaky feeder/coax cable 560.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for automatically orienting an antenna of a mobile system comprising:
   receiving, by the mobile system, a radio frequency (RF) signal from a fixed remote system using the antenna;
   detecting, by the mobile system, a current signal characteristic of the RF signal;
   detecting, by the mobile system, environmental conditions in the proximity of the mobile system, determining, by the mobile system, a current position for the mobile system;

accessing, by the mobile system, a pre-recorded expected signal characteristic for the RF signal at the current position;

determining, by the mobile system, an adjusted expected signal characteristic for the RF signal based on the expected signal characteristic for the RF signal and the environmental conditions;

determining, by the mobile system, a difference between the current signal characteristic and the adjusted expected signal characteristic;

adjusting, by the mobile system, a current orientation of the antenna when said difference exceeds a predetermined threshold, wherein adjusting the current orientation of the antenna comprises adjusting the current orientation of the antenna to an adjusted orientation; and readjusting the antenna, detecting a new current signal characteristic of the RF signal, and determining a difference between the new current signal characteristic and the adjusted expected signal characteristic, on an iterative basis until the difference between the new current signal characteristic and the adjusted signal characteristic does not exceed the predetermined threshold.

2. The method of claim 1, wherein the fixed remote system is located above ground level, the mobile system is located below ground level, receiving the RF signal comprises receiving a very low frequency (VLF) RF signal, and the environmental conditions comprise at least one of temperature and humidity.

3. The method of claim 1, wherein detecting the current signal characteristic comprises detecting at least one of signal strength and signal noise for the RF signal.

4. The method of claim 1, wherein said expected signal characteristic is one of a plurality of expected signal characteristics stored at the mobile system, and wherein the plurality of expected signal characteristics corresponds to a plurality of geographic positions across a predetermined area.

5. The method of claim 4, wherein the plurality of expected signal characteristics further corresponds to signal characteristics that an optimally oriented antenna would detect for each of the corresponding plurality of geographic positions.

6. The method of claim 5, further comprising providing an alert to a user of the mobile system when a geographic position of the mobile system approaches a limit of a coverage area for the RF signal according to the plurality of expected signal characteristics.

7. A method for automatically orienting an antenna of a mobile system comprising:

receiving, by the mobile system, a radio frequency (RF) signal from a fixed remote system using the antenna;

detecting, by the mobile system, a current signal characteristic of the RF signal;

detecting, by the mobile system, environmental conditions in the proximity of the mobile system, determining, by the mobile system, a current position for the mobile system;

accessing, by the mobile system, a pre-recorded expected signal characteristic for the RF signal at the current position;

determining, by the mobile system, an adjusted expected signal characteristic for the RF signal based on the expected signal characteristic for the RF signal and the environmental conditions;

determining, by the mobile system, a difference between the current signal characteristic and the adjusted expected signal characteristic;

adjusting, by the mobile system, a current orientation of the antenna when said difference exceeds a predetermined threshold, wherein an automatic orientation range for the antenna is less than a full range of orientation for the antenna, the method further comprising:

detecting, by the mobile system, when an automatic orientation range limit for the antenna has been reached; and providing, by the mobile system, adjustment instructions to a user for manually orienting the antenna beyond the automatic orientation range, when the automatic orientation range limit has been reached.

8. A system for automatically orienting an antenna of a mobile system comprising:

an antenna configured to receive a radio frequency (RF) signal;

a monitoring module electrically coupled to the antenna and configured to detect a current signal characteristic of the RF signal, environmental conditions in the proximity of the mobile system, and a current position of the mobile system;

a data reference module configured to provide a pre-recorded expected signal characteristic for the RF signal at the current position;

a reporting module in communication with the monitoring module and the data reference module, the reporting module configured to determine an adjusted expected signal characteristic at the current position based on the expected signal characteristic at the current position and the environmental conditions, and a difference between the current signal characteristic and the adjusted expected signal characteristic at the current position; and a control module electrically connected to the reporting module, and configured to adjust a current orientation of the antenna when said difference exceeds a predetermined threshold, wherein the system is configured to readjusting the antenna, detecting a new current signal characteristic of the RF signal, and determining a difference between the new current signal characteristic and the adjusted expected signal characteristic, on an iterative basis until the difference between the new current signal characteristic and the adjusted signal characteristic does not exceed the predetermined threshold.

9. The system of claim 8, wherein the RF signal is a very low frequency (VLF) RF signal, the mobile system is located below ground level, and the environmental conditions comprise at least one of temperature and humidity.

10. The system of claim 8, wherein the current signal characteristic comprises at least one of signal strength and signal noise for the RF signal.

11. The system of claim 8, wherein the data reference module is further configured to store a plurality of expected signal characteristics, which includes the expected signal characteristic, wherein the plurality of expected signal characteristics corresponds to a plurality of geographic positions across a predetermined area.

12. The system of claim 11, wherein the plurality of expected signal characteristics further corresponds to signal characteristics that an optimally oriented antenna would detect for each of the corresponding plurality of geographic positions.

13. The system of claim 12, further comprising an alert module configured to provide an alert to a user of the mobile system when a geographic position of the mobile system approaches a limit of a coverage area for the RF signal according to the plurality of expected signal characteristics.

14. A system for automatically orienting an antenna of a mobile system comprising:
- an antenna configured to receive a radio frequency (RF) signal;
- a monitoring module electrically coupled to the antenna and configured to detect a current signal characteristic of the RF signal, environmental conditions in the proximity of the mobile system, and a current position of the mobile system;
- a data reference module configured to provide a pre-recorded expected signal characteristic for the RF signal at the current position;
- a reporting module in communication with the monitoring module and the data reference module, the reporting module configured to determine an adjusted expected signal characteristic at the current position based on the expected signal characteristic at the current position and the environmental conditions, and a difference between the current signal characteristic and the adjusted expected signal characteristic at the current position; and
- a control module electrically connected to the reporting module, and configured to adjust a current orientation of the antenna when said difference exceeds a predetermined threshold,
- wherein an automatic orientation range for the antenna is less than a full range of orientation for the antenna, the system further comprising a user guiding module configured to provide an adjustment instructions to the user for manually orienting the antenna beyond the automatic orientation range, when an automatic orientation range limit for the antenna has been reached.

15. The system of claim 8, wherein the antenna, monitoring module, reporting module and control module are components of a mobile subsystem, and wherein the data reference module is remotely located from, and configured to wirelessly communicate with, the mobile subsystem.

16. The method of claim 7, wherein the fixed remote system is located above ground level, the mobile system is located below ground level, receiving the RF signal comprises receiving a very low frequency (VLF) RF signal, and the environmental conditions comprise at least one of temperature and humidity.

17. The method of claim 7, wherein detecting the current signal characteristic comprises detecting at least one of signal strength and signal noise for the RF signal.

18. The method of claim 7, wherein said expected signal characteristic is one of a plurality of expected signal characteristics stored at the mobile system, and wherein the plurality of expected signal characteristics corresponds to a plurality of geographic positions across a predetermined area.

19. The method of claim 18, wherein the plurality of expected signal characteristics further corresponds to signal characteristics that an optimally oriented antenna would detect for each of the corresponding plurality of geographic positions.

20. The method of claim 19, further comprising providing an alert to a user of the mobile system when a geographic position of the mobile system approaches a limit of a coverage area for the RF signal according to the plurality of expected signal characteristics.

21. The system of claim 14, wherein the RF signal is a very low frequency (VLF) RF signal, the mobile system is located below ground level, and the environmental conditions comprise at least one of temperature and humidity.

22. The system of claim 14, wherein the current signal characteristic comprises at least one of signal strength and signal noise for the RF signal.

23. The system of claim 14, wherein the antenna, monitoring module, reporting module and control module are components of a mobile subsystem, and wherein the data reference module is remotely located from, and configured to wirelessly communicate with, the mobile subsystem.

24. The system of claim 14, wherein the data reference module is further configured to store a plurality of expected signal characteristics, which includes the expected signal characteristic, wherein the plurality of expected signal characteristics corresponds to a plurality of geographic positions across a predetermined area.

25. The system of claim 24, wherein the plurality of expected signal characteristics further corresponds to signal characteristics that an optimally oriented antenna would detect for each of the corresponding plurality of geographic positions.

26. The system of claim 25, further comprising an alert module configured to provide an alert to a user of the mobile system when a geographic position of the mobile system approaches a limit of a coverage area for the RF signal according to the plurality of expected signal characteristics.

* * * * *